Patented June 22, 1937

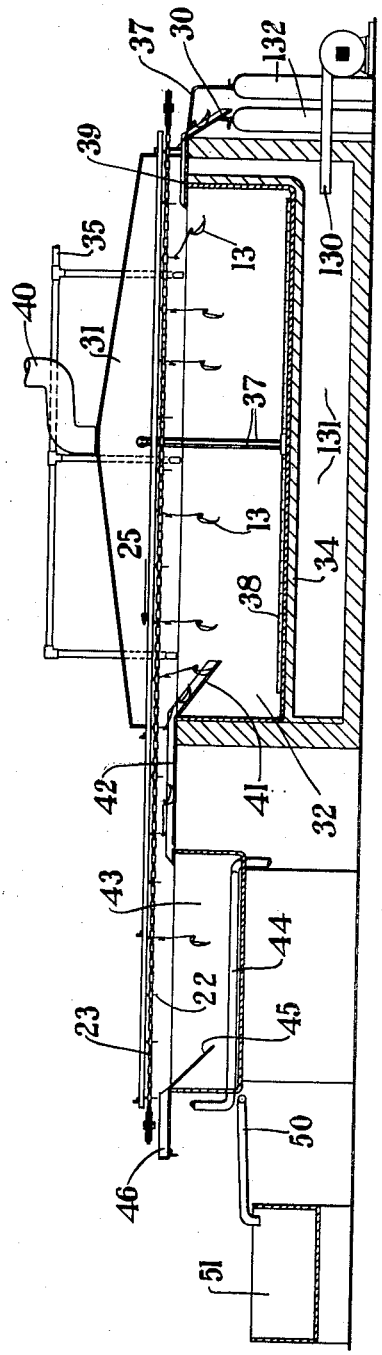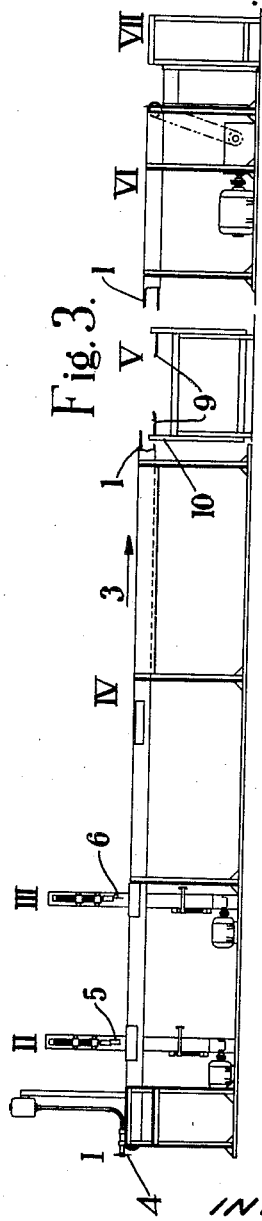

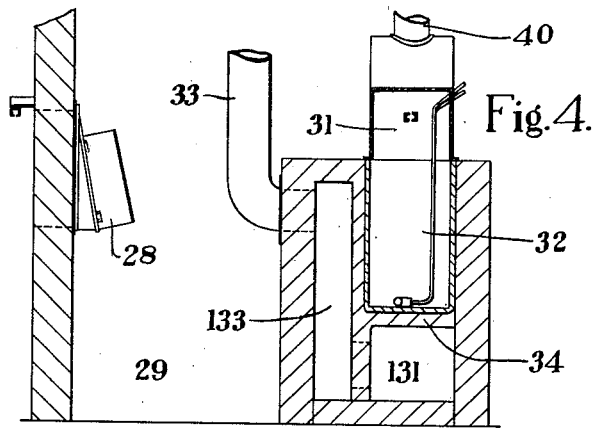
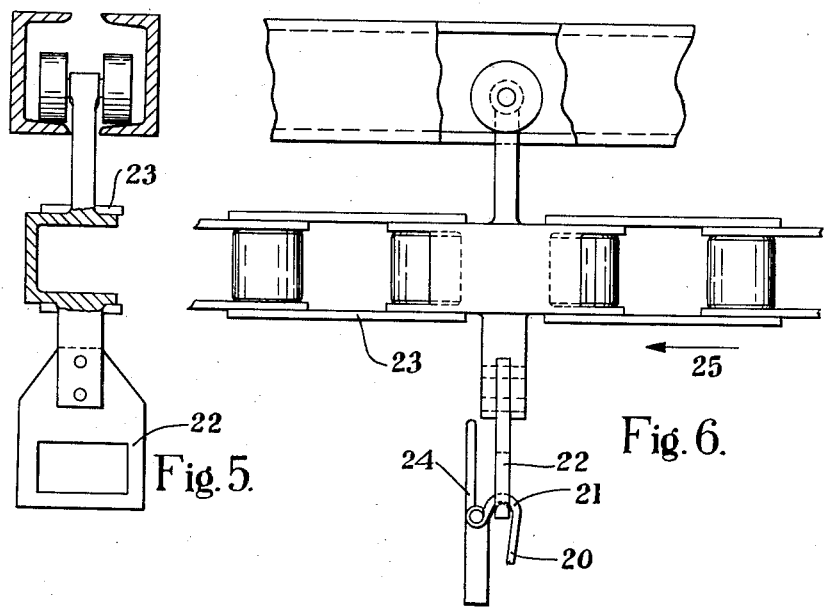

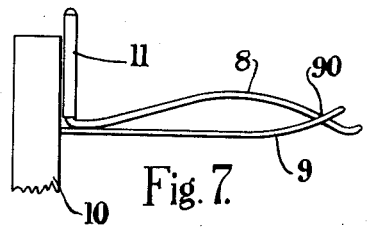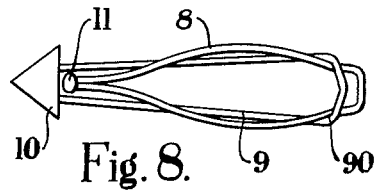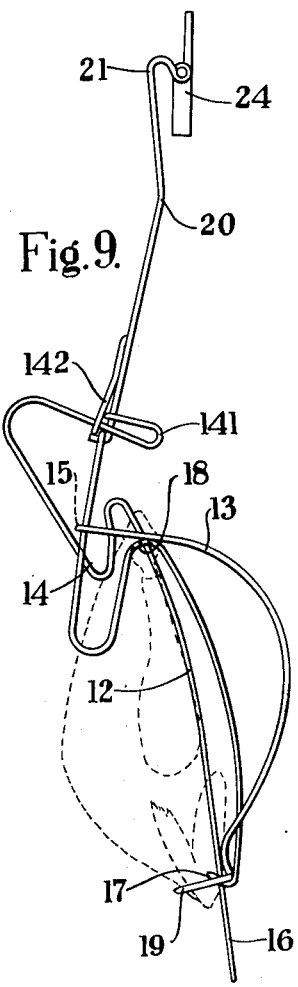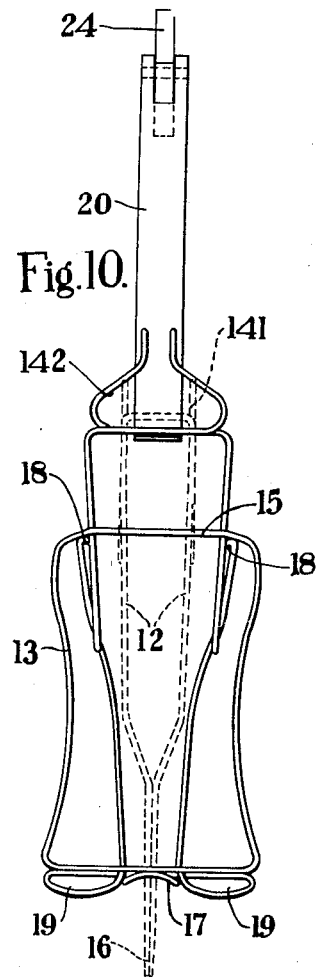

2,084,721

UNITED STATES PATENT OFFICE 2,084,721

PROCESS FOR THE PREPARATION, COOKING, AND CANNING OF CHICKENS AND OTHER BIRDS AND ANIMAL FLESH

William Ross Chamberlin Ashby, Ightham, England

Application November 22, 1933, Serial No. 699,260
In Great Britain December 3, 1932

5 Claims. (Cl. 99—107)

The flesh of chicken or other birds, and certain meats, such as pork and veal, when roasted in the usual manner have a distinctive colour and flavour.

When such flesh or meat in a raw condition, or pre-boiled in water, is inserted in a can, with or without a gelatinous solution and the can is exhausted, sealed and heated in a retort as hitherto adopted in the canning industry, the resulting product has a pale colour and unappetizing appearance, and lacks the flavour usually associated with a roasted product.

One object of the invention is to ensure that the canned product shall have the colour, appearance and flavour normal to that of roasted products, and other objects are to enable such canning to be carried out continuously and expeditiously for a considerable period with practically uniformity in the colour and appearance of the canned product and preferably with the minimum of labour.

An essential step in the process according to the invention is that the dressed carcass or flesh of the chicken or other bird, or piece of meat such as pork or veal, is heated in oil with the exclusion of air or oxygen, for example, is heated with oil in the presence of an inert and innocuous gas such as carbon dioxide, so as to avoid oxidation of the oil and undesirable carbonization of the product.

The flesh, carcasses or pieces of meat before entering the oil are preferably immersed in inert and innocuous gas so as to exclude air from them and to prevent them carrying air into the oil, and after being heated in the oil, which may be effected by immersion in hot oil, they are freed from oil, for example, by washing them with hot water.

The washed products are then canned in any usual manner, for example, they are inserted in cans or other containers, preferably with a gelatinous solution, the cans being subjected to the usual operations of exhausting, sealing, heating in retorts and cooling.

In a continuous process of canning chickens or other birds according to the invention, the plucked carcasses are fed by a conveyor successively to a number of stations where each is subjected to a series of dressing operations by appliances, such as neck slitting, decapitating, leg cutting, gland removing, eviscerating, cleaning and trussing, and are then conveyed through the heated oil in a chamber to which an inert or innocuous gas, such as carbon dioxide, is introduced so as to exclude air from them and from the oil, and thence preferably through a washer to the canning operators.

The apparatus thus may comprise an endless conveyor with a number of dressing tools arranged in the required order and positions, and another endless conveyor adapted to convey the dressed and trussed carcasses to and through the oil and gas and washing chambers, the second conveyor, after delivering the washed carcasses to the canning operators returning to the trussing station.

In the accompanying drawings, one form of apparatus according to the invention for preparing and treating the carcasses of chickens or other birds is illustrated somewhat diagrammatically:—

Figure 2 is a sectional elevation through the oil and washing tanks.

Figure 3 is an elevation of the dressing conveyor.

Figure 4 is a cross-sectional view of the oil tank.

Figures 5 and 6 are fragmentary views of the conveyor chain by which the dressed carcasses are carried through the oil and washing tanks.

Figures 7 and 8 are diagrams showing a pair of eviscerating tools.

Figures 9 and 10 are two views of a trussing cage.

Figure 1:
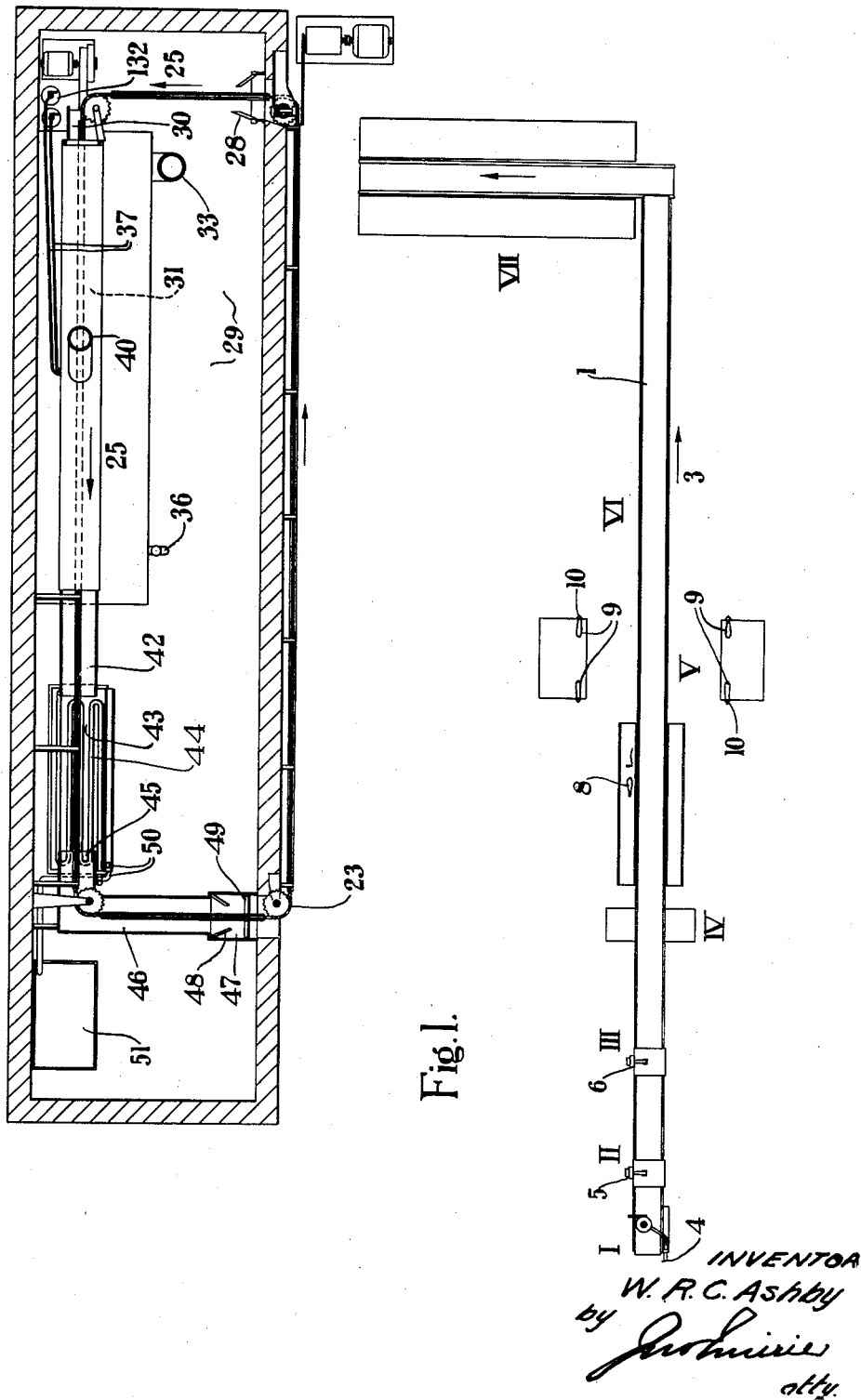
Figure 1 is a plan of the apparatus showing the dressing conveyor, oil bath, washing tank and subsidiary equipment.

In the apparatus illustrated in the accompanying drawings, an endless band conveyor 1 is driven by any suitable means in the direction indicated by the arrow 3, so as to convey carcasses successively to and past the stations I, II, III, IV, V, VI and VII, where the operations of neck slitting, decapitating, leg cutting, gland removing, eviscerating, cleaning and trussing are, respectively, performed by operators at these stations using suitable tools or appliances. The neck slitting is preferably effected by an operator holding the neck of a carcass in a stretched condition against a rotating disc knife 4, so that the neck is slit slantwise to facilitate the formation of a flap subsequently used to close the neck opening. The carcass is then placed on the conveyor and received by the operator at II, who holds it with the neck stretched under a suitably designed guillotine 5 for decapitation. The decapitated carcass is then conveyed to an operator at III, who holds it under a suitably designed guillotine 6 so as to remove the legs just below the hocks, leaving the knuckle bones exposed in order that the grooves in them may be utilized, as hereinafter described, in the trussing frame. The carcass is next conveyed to an operator at IV, who removes the oil gland.

The carcass is then conveyed to an operator who inserts a wire looped frame 8 (Figures 1, 7 and 8) into it, after which it is conveyed to V, where an operator places it on an eviscerating device comprising a wire looped frame 9 fixed in a horizontal position on an upright 10. The operator first draws the carcass onto the frame 9 until the looped end of the frame 8 has passed the looped end of the frame 9 and become engaged therewith, as shown at 90, Figures 7 and 8. The operator then grasps a handle 11 on the frame 8 with one hand and draws off the carcass with the other hand, the viscera being left gripped between the two frames. This eviscerating device preferably is of the form described in the specification of Patent No. 1,984,562, December 18, 1934 and is not claimed per se in the present application. The carcass is then conveyed to an operator at VI, where it is cleaned and inspected. It is then conveyed to an operator at VII who places it in a trussing cage 13 with the neck end downwards and with its wings and legs held in the cage in correct relative positions.

With the carcass in this position, the wire looped frame 12 is passed completely through the carcass.

The looped parts 14 (Figures 9 and 10) of the frame 12 engage with an upper cross bar 15 and the looped parts 141 within the loops 142 of the trussing cage 13, and the opposite tapered end 16 enters a small central loop 17 on the cage. The carcass is thus centered in the cage. Loops 18 engage with the grooves in the knuckle bones of the legs and lock the legs in position. The wing points enter loops 19.

The carcass is thus held in properly trussed condition up on end in the cage 13 with the neck end downwards.

The cage 13 is preferably of the form described and claimed in Patent No. 1,990,580, February 12, 1935, and is not claimed per se in the present application.

The cage 13 has a suspension bar 20 provided with a hook 21 for engagement with a stirrup 22 on an endless chain conveyor 23, the hook having a weighted pivoted latch 24 which prevents the hook leaving the stirrup 22 while allowing it to swing freely in a direction opposite to that of the direction of travel of the conveyor, indicated by the arrows 25, the latch 24, however, eventually permitting of easy removal of the cage from the conveyor, when necessary.

The cages 13 charged with trussed carcasses are conveyed by the endless conveyor 23 through swinging trap doors 28 into a room 29, up a chute 30 through a restricted entrance into a chamber 31, which contains a tank 32 which is filled with suitable oil. The oil should be one which will adequately heat the carcass without tainting. A suitable oil is oleum araches known as ground nut oil.

The tank is heated by suitable means, such as an oil burner 130, the gases of combustion from which pass along a flue 131 under the tank and a return flue 133 along the side of the tank to a chimney flue 33.

In order to avoid overheating of the tank, it may be protected by a fire-brick layer 34. The oil burner may be of any type well known in the art, regulated by hand or by a thermostatically controlled device to maintain the oil at a fairly constant temperature which may be from about 300 to 500° F. according to the amount of cooking desired or the time in which the carcasses are in the oil.

An oil supply pipe 35 and a drain pipe 36 enable the tank to be filled and emptied as required. When used continuously for about 48 hours, it is preferred to discharge the oil and refill the tank with fresh oil.

An inert or innocuous gas, such as carbon dioxide, is introduced into the chamber 31, for example, from bottles 132 of compressed or liquefied gas and by means of pipes 37, which unite in a pipe 38. The pipe 38 is conveniently situated in the tank 32, so that the gas bubbles through the oil therein and escapes into the chamber 31 above the tank. Thus, air is excluded from the oil and from the vicinity thereof.

The cages 13 which pass up the chute 30 are dragged along a guide plate 39, so that the carcasses are immersed in gas before entering the tank.

Any air in the carcasses is replaced by gas and, together with any air which may be drawn in through the restricted entrance, is led away by a flue pipe 40, so as to avoid air getting into contact with the oil in the tank.

As the cages swing off the plate 39, they fall into the heated oil in the tank 32 and are immersed therein.

After passing through the oil, they are lifted therefrom by the cages 13 riding up a chute 41. They are then conveyed through a restricted exit and over a trough 42, which receives any oil draining from them, and they are then conveyed through a washing tank 43 containing water conveniently heated by a steam coil 44. Scum on the water in the tank 43 is led away, by a scum pipe 50, to a tank 51. After the carcasses are washed in this tank to remove oil adhering to them, they are lifted by their cages 13 riding up a chute 45 and, after passing over a draining trough 46, are conveyed out of the room 29 through an air lock 47 fitted with two pairs of trap doors 48 and 49. As they emerge from the room 29, the cages 13 are removed from the endless conveyor 23 and the carcasses in the roasted and trussed condition are then inserted in cans or other containers, which are charged with gelatinous solution, exhausted of air, sealed, heated in retorts to complete the sterilization and cooled in the manner and by appliances well known in the canning art.

When pieces of meat, such as pork or veal, are to be treated according to the invention, the flesh is dressed and cut up in the usual manner and the pieces of meat are placed in cages, or on hooks of any suitable form, but having means, preferably such as above described with reference to the cages 13, by which they can be suspended on the conveyor 23 and carried through the oil tank 32 and washing tank 43 before sealing in the cans or other containers.

It will be understood that instead of the products being plunged into the hot oil, the heated oil may be poured or sprayed onto them, so long as it is effected in the presence of an inert or innocuous gas.

I claim:

1. A process of treating fowl and particularly chicken for canning, consisting in passing the fowl through an inert atmosphere to remove oxygen therefrom, and then passing it through a body of heated oil from which the oxygen has been removed, whereby to cook the fowl and produce a roast product.

2. A process of treating fowl and particularly chicken for canning, consisting in subjecting the fowl to treatment to remove oxygen therefrom, and then passing the fowl while substantially free of oxygen through a body of heated oil from which the oxygen has been removed, whereby to cook the fowl and produce a roast product.

3. A process of treating fowl and particularly chicken for canning, consisting in subjecting heated oil to treatment with an inert gas to remove oxygen from the oil, with such oil treatment serving to maintain an inert atmosphere above the oil, then passing the fowl through the inert atmosphere above the oil and then into the oil to cook the fowl and produce a roast product.

4. A process of treating fowl and particularly chicken for canning, consisting in subjecting heated oil to the action of carbon dioxide to substantially remove oxygen from the oil and to maintain an inert atmosphere above the oil, and passing the fowl through the inert atmosphere and directly into the oil to cook the fowl and produce a roast product.

5. A process of treating fowl and particularly chicken for canning, consisting in immersing the fowl in an inert innocuous gas to exclude air from the fowl, and immediately thereafter subjecting the air-free fowl to a cooking action in heated oil from which oil the oxygen has been removed, whereby during the cooking action undesirable carbonization of the fowl is avoided and a roast product is produced.

WILLIAM ROSS CHAMBERLIN ASHBY.